Oct. 22, 1957    F. B. FRANCIS    2,810,604
SEE-THROUGH VISOR
Filed Aug. 25, 1954
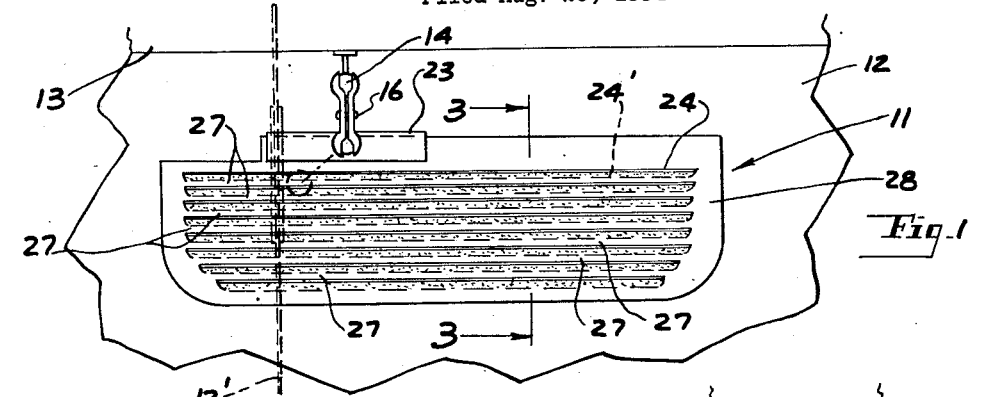
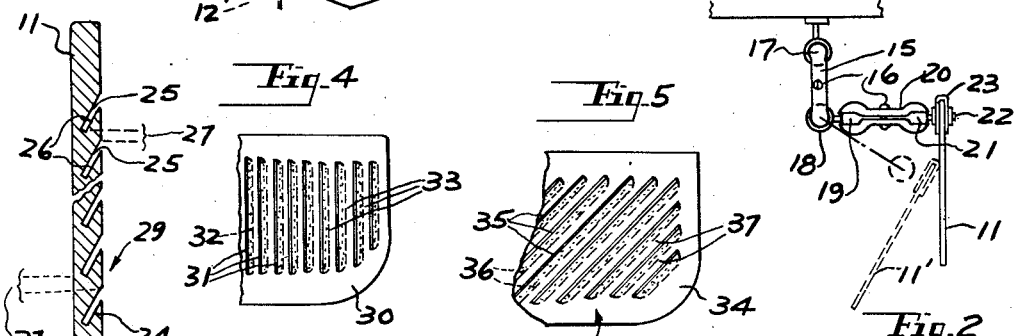
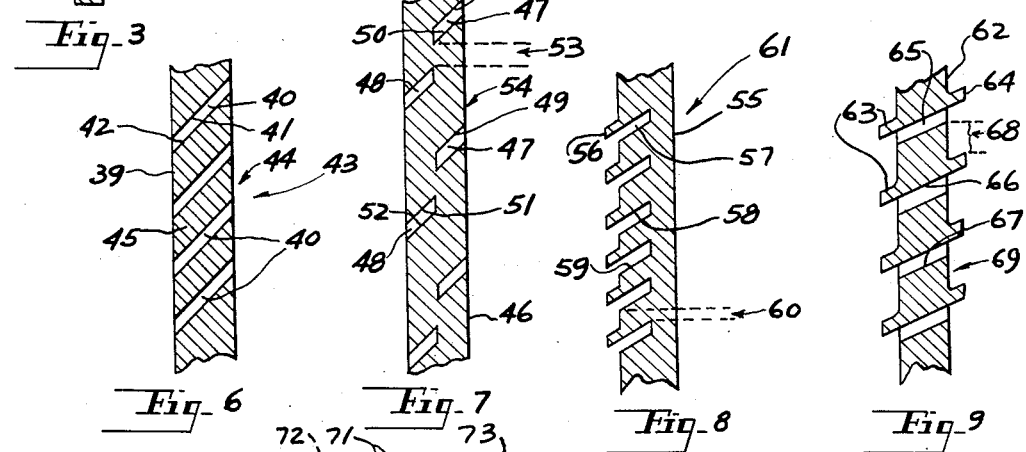
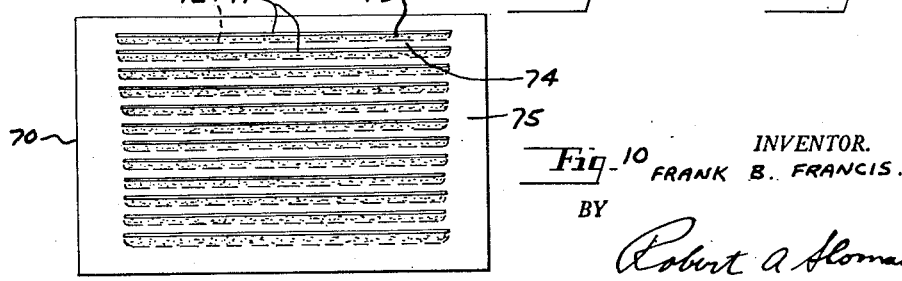
INVENTOR.
FRANK B. FRANCIS.
BY
Robert A. Sloman
ATTORNEY.

United States Patent Office 2,810,604
Patented Oct. 22, 1957

2,810,604

SEE-THROUGH VISOR

Frank B. Francis, Dearborn, Mich.

Application August 25, 1954, Serial No. 452,069

3 Claims. (Cl. 296—97)

This invention relates to an article of manufacture, and more particularly, to a see-through visor construction.

It is the object of the present invention to provide an article of manufacture which consists of a transparent plate having cut therein a series of parallel spaced inclined slots which thus form into the transparent plate a series of inclined light shades, which are substantially opaque.

It is the further object of the present invention to provide a transparent plate of a plastic material having a series of inclined slots cut therein, with the cutting of such slots forming in the material of the plate a series of substantially opaque areas which will serve as a light shade.

It is the further object of the present invention to incorporate such article of manufacture into a see-through visor for use on vehicles whereby the amount of light which will pass through the visor can be controlled by the angular positioning thereof by the user.

These and other objects will be seen from the following specification and claims in conjunction with the appended drawing in which:

Fig. 1 is a fragmentary front elevational view of a portion of a vehicle windshield with the present see-through visor with respect thereto.

Fig. 2 is a fragmentary side elevational view of a structure shown in Fig. 1 illustrating the universal mounting of the visor.

Fig. 3 is a section taken on line 3—3 of Fig. 1.

Fig. 4 is a fragmentary elevational view of a slightly different form of visor construction.

Fig. 5 is a similar view of still another form of visor construction.

Fig. 6 is a fragmentary elevational section of an article of manufacture of the present invention with a slightly different formation of slots.

Fig. 7 is a similar view showing still a different arrangement of cut slots.

Fig. 8 is a similar view showing a slightly different formation of the transparent plate and the slots cut therein.

Fig. 9 is a similar view of still another variation of the present article of manufacture; and Fig. 10 is a front elevational view of the present article of manufacture as it might be used for a windowpane or related structure.

It will be understood that the above drawing illustrates merely a preferred embodiment of the invention and that other embodiments are contemplated within the scope of the claims hereafter set forth.

Referring to the drawing, the present article of manufacture as shown in Figs. 1 and 10 consists of a transparent plate which may be of glass, but which in the preferred embodiment is constructed of a plastic material. The present article of manufacture more generally described with respect to Fig. 10, is embodied in a see-through visor 11, as shown in Fig. 1. Said visor is particularly adapted for a vehicle having windshield 12 and the frame 13, which is fragmentarily shown. Depending from the upper portion of said frame in a conventional manner is the ball support 14 upon which are mounted a pair of opposed swivel clamps 15, whose opposed hemispherical end portions 17 retainingly engage around the ball 14. The corresponding lower ends of said clamp engage around a second ball 18, from which is spaced a third ball 19. As shown in Fig. 2, there is a second pair of opposed clamping elements 20 of similar hemispherical portions at their opposite ends, one set of which cooperatively engage over ball 19. Both of said clamps are adjustably secured together by screws 16.

The opposite ends of clamp 20 engage around the ball 21, which is carried upon the end of a bolt 22, which extends through the mounting plate 23 of U-shape which lies over the upper edge of visor 11 and is suitably secured thereto to thereby provide a universal mounting for the said visor with respect to the vehicle windshield 12.

The present article of manufacture in one preferred embodiment is shown in the form of the visor 11 and has cut in its exterior surface and extending thereinto a series of parallel spaced elongated slots 24, which are arranged at an acute angle to the plane of the plate 11. Said slots extend down into the said plate, as indicated at 24'. It will be noted however, as shown in Fig. 3, that the said slots have such vertical spacing between them that the corresponding edges of adjacent slots are spaced apart vertically to thereby provide a portion of the said plate which is unaffected by the said slots, producing a series of alternate transparent strips 27 in said plate, through which objects may be viewed.

Inasmuch as the slots 24—24' are cut within the plate 11, it has been found that the bounding walls 25 and 26 in said plate corresponding to each of said slots provide substantially opaque areas or strips which act as light shades.

It has been found that using a tinted plate, for illustration, the said slots provide a series of elongated inclined light shades which are substantially opaque but which may vary from opaque to translucent, with the amount of translucency being controllable, depending upon the thickness of the material of the plate and the texture of the slots formed therein.

Thus there is formed within the plate 11 a series of downwardly inclined shades, which are formed entirely within the plane of the plate, and each of these shades has provided therebetween a series of alternate transparent strips 27, which extend throughout the length of the said slots 24—24'.

The uncut portions of the plate 11 provide the transparent marginal portions 28 in the said visor to thereby complete the visor construction.

Referring to Figs. 1 and 3, when looking through the upright plate 11 at right angles to the plane of said plate, as indicated at 27, there are provided the series of above described transparent strips 27, through which there can be good visibility. It is contemplated, however, that by using a tinted plastic material, or other material, in the formation of the plate, the said strips may range from transparent to slightly translucent, thereby controlling the amount of light which will pass through the strips 27.

By mounting the plate 11, or the plate 70 hereafter described, at an acute angle to a vertical plane, the amount of visibility through the said visor or plate can be regulated. Conversely, such angular tilting of the visor or plate will also control the amount of light, such as sunlight, which will be shielded from the eyes of the user, or will be reflected from the interior of the building upon which such a plate might be mounted.

In the case of a vehicle, where there is a universal mounting for the visor, as in Figs. 1 and 2, by tilting the visor so that the slots 24 are moved towards the horizontal, the vertical height of the transparent strips 27 will be increased to thereby increase visibility and to increase the amount of light which will pass through the visor or plate. Alternately, by tilting the said visor so that the slots 24 are moved towards the vertical, the effective visibility for the strips 27 is reduced gradually to the extent that upon sufficient tilting, substantially all of the light can be excluded or cut off from passage through the visor.

This provides a convenient method in the case of a driver of the vehicle regulating the visor so that he may see through it if he wishes, depending upon the sunlight or, at night, in the case of blinding lights, and at the same time he can control exactly the amount of light which will pass through the visor, or may cut it off entirely.

The said slots 24 are inclined angularly downward from one side of the plate 11, and this angle may be varied within zero and 50 degrees from the vertical, depending upon the depth of the cut and the thickness of the material employed.

When the plate 11 of Fig. 3 is tilted so that the slots 24 are substantially horizontal, there is provided the maximum visibility, as indicated at 29 through the strips 27.

Fig. 4 fragmentarily illustrates a slight variation in the construction of a visor 30 wherein the slots 31—32 cut therein are arranged in an upright position and are longitudinally spaced throughout the length of the plate 30 to provide between adjacent slots the series of upright transparent strips 33. This visor will also act as a light shade with the extent of visibility through the strips 33 being regulated by angular adjustment of the visor 30 upon a vertical axis.

Another variation is fragmentarily illustrated in Fig. 5, wherein there are cut within the visor 34 a series of parallel spaced inclined elongated slots 35—36. The said slots are spaced from each other to thereby provide the transparent strips 37. The marginal portions 38 of visor 34 are transparent.

Fig. 6 shows a slightly different form of construction of an article of manufacture employing the present invention wherein the transparent plate 39, preferably of a plastic material, has cut entirely through its face a series of parallel spaced inclined slots 40. The portions of the plate 39 bounding said slots, i. e., the walls 41 and 42, are rendered substantially opaque to thereby provide within the said plate a series of inclined vertically spaced light shades. Here also, while the shades are opaque, it is contemplated that the shades may be from opaque to translucent, depending upon the amount of light which is desired to be excluded from passage through the said plate.

By virtue of the arrangement of the slots 40, when the said plate is viewed in a direction at right angles to the plane of the plate, as indicated at 43, there is practically no transmission of light through the said plate, except such refracted or reflected rays which may travel in the direction of arrow 44. However, upon angular adjustment of the said plate, so that the view would be in the direction of arrow 44, then in that case, the maximum amount of light would pass through the said transparent plate elements 45. Under such conditions, for illustration, the said slots 40 would be extending horizontally with respect to the viewer.

A slight variation of the construction of the present article of manufacture is shown in Fig. 7, which includes a transparent plate 46, which has cut therein a series of parallel spaced inclined slots 47, with the bounding surfaces 49 and 50 of said slots providing opaque areas or elongated light shades. Arranged upon the opposite side of plate 46 is a second series of spaced angularly inclined cut slots 48 which are parallel to slots 47. Similarly, the bounding wall portions 51 and 52 of the said slots, due to the cutting thereof, are substantially opaque, to prevent the passage of light through those portions of the said plate. The two sets of slots 47 and 48 are arranged alternately in staggered relation, nevertheless, the said slots are all parallel to each other.

The said slots are furthermore vertically spaced with respect to each other to thereby define between adjacent edges of an adjacent pair of slots, the elongated transparent strips such as indicated at 53 permitting visibility through the said plate. By tilting the said plate so that the slots approach a horizontal portion, visibility through the said plate is increased, as indicated by the increased transparent area designated by the arrow 54.

Another variation of the invention is shown in Fig. 8 wherein there is provided a transparent plate 55. There is formed upon one side of said plate a series of outwardly projecting parallel spaced downwardly inclined strips 56. There are also cut within the said plate a series of downwardly inclined parallel spaced slots 57. The top bounding walls 58 of said slots formed in the material 55 of the said plate are substantially opaque, as are the other bounding surfaces 59 defining said slots. The wall portions 58 of said slots correspond to the similarly inclined undersurfaces of the outwardly projected strips 56.

The adjacent end portions of a pair of slots within said sheet are vertically spaced from each other to thereby define a series of transparent strips, as generally indicated at 60, which strips, in the embodiment shown in Fig. 8, extend horizontally and are arranged intermediate each pair of slots 57. In view of the inclination and spacing of said slots, the transparent strips as viewed at 60 are of limited vertical extent, so that there are provided within the sheet a series of inclined light shades. By angularly positioning sheet 55 so that the slots therein are rotated towards the horizontal, the apparent vertical height of the transparent strips is increased, as indicated by arrow 61, which designates the angle of view with respect to the plane of the sheet.

Another variation of the present plate is shown in Fig. 9, wherein the transparent sheet 62 has projected from opposite sides thereof a series of aligned pairs of angularly extending strips 63 and 64, which project from opposite sides of the said sheet as extensions at their undersurfaces of the top bounding walls 66 of each of the slots 65 which extend through the said sheet. The slots 65 are also bounded by walls 67.

The said slots 65 are arranged in parallel spaced relation and are inclined at an acute angle to the plane of the sheet or plate 62. The said slots extend throughout a substantial portion of the dimension of the plate in the direction of the said slots to thereby define a series of inclined light shades which are formed entirely within the said sheet, due to the cutting therethrough of the series of slots. These shades are partially increased in width by the said strip extension 63 and 64, assuming that the undersurfaces thereof upon the exterior of said sheet are cut at the same time as are slots 65.

The corresponding adjacent ends of the said slots are vertically spaced with respect to each other so that there are provided a series of vertically spaced transparent strips, as indicated at 68. By angularly tilting the said sheets with respect to the eyes of a viewer, the apparent vertical extent of the transparent strips is increased, as designated by the arrow 69.

Fig. 10 indicates at 70 another embodiment of the present article of manufacture when used as a window pane or the like, which pane is preferably of rectangular shape and has formed therein a series of parallel spaced longitudinally extending inclined slots 71—72. Said slots at their adjacent longitudinal edges are vertically spaced to thereby define a series of transparent strips 74 through which there is good visibility when viewing objects through the said plate 70 at an angle of 90 degrees to the plane thereof. In view of the opaque areas designated at 73, by virtue of the said cuts 71—72 which are made within the plate, there are thus provided within the sheet or pane a series of downwardly inclined light shades. By tipping the plate at an acute angle to the vertical, so as to move the slots 71 towards a vertical position, less light will be transmitted through the transparent strips 74, as in effect their effective vertical heights are decreased. Similarly, if the sheet 70 is so tilted as to move the slots toward a horizontal position, then in that case the apparent vertical height of the transparent strips 74 is increased, permitting increased passage of light therethrough. The marginal unslotted portions of sheet 70, as at 75, are transparent.

While the marginal portions of the various slots above described are normally rendered substantially opaque, due to the cutting thereof, it is contemplated as a part of the present invention that these areas may be from opaque to translucent, depending upon the thickness of the material, the extent of the slots, and possible tinting of the material.

On the other hand, the transparent strip 74, above described as such, could be transparent to translucent, depending upon the amount of tinting or other character of the material from which the sheet 70 is constructed.

The slots 40 in extending entirely through transparent plate 39 also provide additional function of permitting ventilation in a case where the article of manufacture is used as a part of an enclosure wall such as might be done in a windowpane or in the construction of a telephone booth.

It is also contemplated as a part of the present invention that the said slots hereinabove described as being cut within the material of the plate, might be initially formed or moulded into the final plate construction. Under some conditions the bounding walls of the moulded slots will be sufficiently opaque as to provide for the series of inclined spaced light shades described. On the other hand, under certain conditions where the bounding walls in the material of the plate defining the said slots are not sufficiently opaque, then these walls may be painted or dyed to thereby render the same opaque.

The visor designation 12′ in Fig. 1 indicates visor 11 when tilted into a vertical position and in a plane at right angles to windshield 11.

In Fig. 2, 11′ shows visor 11 tilted to an angular position relative to the original position 11.

Having described my invention, reference should now be had to the claims which follow for determining the scope thereof.

I claim:

1. As an article of manufacture, a see-through visor for a vehicle consisting of a transparent plastic plate, mounting means for tiltably and adjustably supporting said plate adjacent the windshield of said vehicle and for rendering it movable into the line of vision of the driver thereof, said plate having cut in one face thereof a first series of spaced, parallel, elongated slots arranged at an acute angle to the plane of the plate and into the opposite face thereof, a second series of spaced, parallel, elongated slots parallel to and alternately spaced from said first slots, the material forming the surface of each of said cut slots being roughened whereby said surface is rendered substantially opaque, the said slots thereby defining a series of parallel, spaced, inclined opaque shades with alternate transparent strips thereinbetween, and the said slots terminating inwardly of the marginal edges of said visor plate, the peripheral border defined thereby being transparent.

2. As an article of manufacture, a see-through visor for a vehicle consisting of a transparent plastic plate, mounting means for tiltably and adjustably supporting said plate adjacent the windshield of said vehicle and for rendering it movable into the line of vision of the driver thereof, said plate having cut therein a series of spaced, parallel, elongated slots arranged at an acute angle to the plane of said plate, there being a series of longitudinal strips extending angularly outwardly from the plane of said plate, the undersurfaces of said strips forming co-planar extensions of the top walls of said slots, the material forming the surface of each of said cut slots and their co-planar extensions being roughened whereby said surface is rendered substantially opaque, the said slots and extensions thereby defining a series of parallel, spaced, inclined opaque shades with alternate transparent strips thereinbetween, and the said slots and extensions terminating inwardly of the marginal edges of said visor plate, the peripheral border defined thereby being transparent.

3. As an article of manufacture, a see-through visor for a vehicle consisting of a transparent plastic plate, mounting means for tiltably and adjustably supporting said plate adjacent the windshield of said vehicle and for rendering it movable into the line of vision of the driver thereof, said plate having cut therein a series of spaced, parallel, elongated slots arranged at an acute angle to the plane of said plate, said slots extending entirely through said plate, there being a series of aligned pairs of longitudinal ribs extending angularly outwardly from the opposite sides of the plate, with the undersurfaces of each pair of strips forming co-planar extensions of the top bounding walls of the corresponding slot, the material forming the surface of each of said cut slots and their co-planar extensions being roughened whereby said surface is rendered substantially opaque, the said slots and extensions thereby defining a series of parallel, spaced, inclined opaque shades with alternate transparent strips thereinbetween, and the said slots and extensions terminating inwardly of the marginal edges of said visor plate, the peripheral border defined thereby being transparent.

References Cited in the file of this patent

UNITED STATES PATENTS

| | | |
|---|---|---|
| 737,979 | Wadsworth | Sept. 1, 1903 |
| 1,156,578 | Benecke | Oct. 12, 1915 |
| 1,467,203 | Smith | Sept. 4, 1923 |
| 1,585,659 | Fogelquist | May 25, 1926 |
| 1,600,461 | Ensign | Sept. 21, 1926 |
| 2,074,247 | Armstrong | Mar. 16, 1937 |
| 2,239,015 | Powell | Apr. 22, 1941 |
| 2,511,590 | Keck | June 13, 1950 |
| 2,665,610 | Harrison | Jan. 12, 1954 |
| 2,689,387 | Carr | Sept. 21, 1954 |